(12) United States Patent
Xu et al.

(10) Patent No.: US 11,128,096 B2
(45) Date of Patent: Sep. 21, 2021

(54) FEMTOSECOND LASER MULTIMODALITY MOLECULAR IMAGING SYSTEM

(71) Applicant: FEMTOSECOND RESEARCH CENTER CO., LTD., Guangzhou (CN)

(72) Inventors: Bingwei Xu, Guangzhou (CN); Xin Zhu, Guangzhou (CN)

(73) Assignee: FEMTOSECOND RESEARCH CENTER CO., LTD., Guangzhou (CN)

( * ) Notice: Subject to any disclaimer, the term of this patent is extended or adjusted under 35 U.S.C. 154(b) by 0 days.

(21) Appl. No.: 16/644,517

(22) PCT Filed: Sep. 28, 2018

(86) PCT No.: PCT/CN2018/108303
§ 371 (c)(1),
(2) Date: Mar. 5, 2020

(87) PCT Pub. No.: WO2019/062844
PCT Pub. Date: Apr. 4, 2019

(65) Prior Publication Data
US 2020/0295519 A1    Sep. 17, 2020

(30) Foreign Application Priority Data

Sep. 30, 2017 (CN) .......................... 201710916860.3

(51) Int. Cl.
*H01S 3/00* (2006.01)
*H01S 3/067* (2006.01)
(Continued)

(52) U.S. Cl.
CPC ........ *H01S 3/0057* (2013.01); *H01S 3/06725* (2013.01); *H01S 3/06741* (2013.01); *H01S 3/10053* (2013.01); *H01S 3/1618* (2013.01)

(58) Field of Classification Search
CPC ............... H01S 3/0057; H01S 3/06725; H01S 3/06741; H01S 3/10053; H01S 3/1618;
(Continued)

(56) References Cited

U.S. PATENT DOCUMENTS 6,327,068 B1 * 12/2001 Silberberg ............ H01S 3/0057
359/239
7,391,557 B1 * 6/2008 Bruch ....................... G01J 3/10
356/450

(Continued)

FOREIGN PATENT DOCUMENTS

CN    103219638 A    7/2013
CN    106936066 A    7/2017
(Continued)

OTHER PUBLICATIONS

Haohua Tu et al., Compression of fiber supercontinuum pulses to the Fourier-limit in a high-numerical-aperture focus, Optics Letters, Jun. 15, 2011, pp. 2315-2317, vol. 36, No. 12.

(Continued)

*Primary Examiner* — Xinning(Tom) Niu
(74) *Attorney, Agent, or Firm* — Bayramoglu Law Offices LLC (57) ABSTRACT

A femtosecond laser multimodality molecular imaging system includes a near-infrared pulse generation device for providing near-infrared pulses with a central wavelength of 1010 nm to 1100 nm and a spectral width of less than 25 nm. The near-infrared pulses can excite an optical medium with strong nonlinearity to generate the femtosecond laser pulses with ultra-wide spectrum. A pulse measurement compression and control module measures and compensates the accumulated dispersion of the femtosecond laser pulses arriving at the tissue sample, so as to eliminate the "time domain broadening" effect as much as possible. The obtained shortest pulses can interact with the tissue sample (Continued)

to generate spectral signals from different modalities, thus providing a variety of nonlinear molecular image modalities.

14 Claims, 4 Drawing Sheets

(51) Int. Cl.
*H01S 3/10* (2006.01)
*H01S 3/16* (2006.01)

(58) Field of Classification Search
CPC .............. G02B 21/16; G02B 21/06; G01N 2021/6415; G01N 2021/6419; G01N 2021/6421; G01N 21/65; G01N 21/6458; G01N 21/71; G01N 2201/127; G01J 11/00

See application file for complete search history.

(56) References Cited

U.S. PATENT DOCUMENTS

| | | | |
|---|---|---|---|
| 7,872,759 B2* | 1/2011 | Tearney | ............... G01B 9/04 356/479 |
| 2012/0049092 A1 | 3/2012 | Tu et al. | |
| 2014/0347462 A1 | 11/2014 | Schanne-Klein et al. | |
| 2015/0204790 A1* | 7/2015 | Yonetani | ............... G01N 21/65 356/301 |
| 2017/0293259 A1* | 10/2017 | Ochiai | ............... G03H 1/0005 |

FOREIGN PATENT DOCUMENTS

| CN | 107462336 A | 12/2017 |
|---|---|---|
| JP | 2006313273 A | 11/2006 |

OTHER PUBLICATIONS

A. M. Weiner et al., Femtosecond pulse shaping using spatial light modulators, Review of Scientific Instruments, May 2000, pp. 1929-1960, vol. 71, No. 5.

Bingwei Xu et al., Quantitative investigation of the multiphoton intrapulse interference phase scan method for simultaneous phase measurement and compensation of femtosecond laser pulses, Journal of the Optical Sciety B, Apr. 2006, pp. 750-759, vol. 23, No. 4.

Haohua Tu et al., Scalar generalized nonlinear Schrödinger equation-quantified continuum generation in an all-normal dispersion photonic crystal fiber for broadband coherent optical sources, Optics Express, Dec. 20, 2010, pp. 27872-27884, vol. 18, No. 26.

Haohua Tu et al., Stain-free histopathology by programmable supercontinuum pulses, Supplementary Information to the article, Nature Photonics, 2016, pp. 534-540, vol. 10.

* cited by examiner

FEMTOSECOND LASER MULTIMODALITY MOLECULAR IMAGING SYSTEM

CROSS REFERENCE TO THE RELATED APPLICATIONS

This application is the national phase entry of International Application No. PCT/CN2018/108303, filed on Sep. 28, 2018, which is based upon and claims priority to Chinese Patent Application No. 201710916860.3, filed on Sep. 30, 2017, the entire contents of which are incorporated herein by reference.

TECHNICAL FIELD

The present invention relates to the technical field of femtosecond laser equipment, and more particularly relates to a femtosecond laser multimodality molecular imaging system.

BACKGROUND

In the traditional supercontinuum generation method, 50-femtosecond low power pulses (pulse energy less than 3 nJ) is employed to excite photonic crystal fibers with a length less than 10 mm to obtain a supercontinuum, while ensuring that the zero dispersion wavelength of the photonic crystal fibers used is within the wavelength range of the generated supercontinuum. For example, when a supercontinuum with a wavelength range of 600-900 nm is generated, the zero dispersion wavelength of the photonic crystal fibers must be within the wavelength range of 600-900 nm. However, the optical pulse of the supercontinuum generated by this method has low quality, a relatively low power, and a poor optical stability, which is unable to excite all nonlinear molecular image modality. In addition, when passing through the optical path, the femtosecond laser pulses will cause the "pulse broadening effect in time domain", that is, the dispersion in the optical path, especially the second-order dispersion and the higher-order dispersion, will increase the width of the femtosecond pulse on the time axis as transmitting in the optical path, so that the peak power of the femtosecond pulse is greatly reduced and the nonlinear effect between the pulse and the sample weakens or even disappears.

SUMMARY

In order to address the issues in the prior art, namely (i) that the average power of femtosecond laser pulses generated by supercontinuum is low, and (ii) that the peak power of femtosecond pulses is reduced due to dispersion, the present invention provides a femtosecond laser multimodality molecular imaging system, which can provide femtosecond pulses with high power and effectively eliminate the influence of dispersion.

A femtosecond laser multimodality molecular imaging system includes a supercontinuum generation module, a pulse measurement compression and control module and an optical microscope module.

The supercontinuum generation module includes a near-infrared pulse generation device, and an optical medium with strong nonlinearity. The near-infrared pulse generation device is configured to provide near-infrared pulses. The optical medium with strong nonlinearity is configured to be excited by the near-infrared pulses to generate femtosecond laser pulses. The near-infrared pulses have a center wavelength of 1010 nm to 1100 nm, and a spectral width of less than 25 nm.

The pulse measurement compression and control module includes a first optical component and a measurement module. The first optical component is configured to receive the femtosecond laser pulses. The measurement module is configured to measure a dispersion in an optical path of a system, and, according to the measurement result, adjust parameters of the first optical component to perform dispersion compensation on the femtosecond laser pulses to obtain compressed femtosecond laser pulses.

The optical microscope module includes a second optical component, a sample stage and a first signal acquisition device. The compressed femtosecond laser pulses arrive at the sample stage after passing through the second optical component, and interact with a tissue sample on the sample stage to generate multimodality signals. The first signal acquisition device is configured to collect the multimodality signals.

Further, the near-infrared pulse generation device is an Ytterbium-doped fiber laser or a pulsed laser, and a pulse width of the near-infrared pulse generation device is less than 1,500 femtoseconds.

A spectral range of the femtosecond laser pulses generated from the optical medium with strong nonlinearity is from 750 nm to 1300 nm.

The optical medium with strong nonlinearity is a birefringent photonic crystal fiber, and the birefringent photonic crystal fiber has a length of more than 45 mm, a birefringence of at least $5*10^{-6}$, and a normal dispersion in a transmitted band.

Further, the first optical component is a pulse shaper including an active adaptive optical device. The pulse shaper includes a first grating, a first convex lens, a liquid-crystal spatial light modulator, a second convex lens and a second grating, which are arranged successively. The first grating is located in the focal point of the first convex lens. A distance between the first convex lens and the liquid-crystal spatial light modulator is one focal length, a distance between the liquid-crystal spatial light modulator and the second convex lens is one focal length, and a distance between the second convex lens and the second grating is one focal length.

Further, the measurement module includes a control device, a second signal acquisition device, and a nonlinear crystal placed on the sample stage.

The femtosecond laser pulses are focused on the nonlinear crystal to generate a nonlinear spectrum after passing through the pulse measurement compression and control module and the optical microscope module. The second signal acquisition device is configured to collect nonlinear spectrum signals and transmit the nonlinear spectrum signals to the control device.

The control device is configured to control parameters of the liquid-crystal spatial light modulator to introduce a known reference spectral phase function. A dispersion function of the optical path of the system is measured by changing the known reference spectral phase function. According to the dispersion function, the parameters of the liquid-crystal spatial light modulator are adjusted to control the spectral phase of each wavelength of the femtosecond laser pulses, so as to counteract the dispersion.

Further, the nonlinear crystal is a Barium Boron Oxide (BBO) crystal or a Potassium Dihydrogen Phosphate (KDP) crystal, and the thickness of the nonlinear crystal is from 10 μm to 300 μm.

Further, the known reference spectral phase function includes a parabolic function and a sinusoidal function. The nonlinear spectrum is a second harmonic spectrum.

The control device is further configured to analyze the maximum value of the second harmonic spectrum each time the known reference spectral phase function is changed, so as to obtain a second derivative of the dispersion to be measured, and integrate the second derivative twice to obtain the dispersion function of the optical path of the system.

Further, the control device is configured to change parameters of the pulse shaper to introduce a negative function of the dispersion function and control the spectral phase of each wavelength of the femtosecond laser pulses to counteract the dispersion.

The control device is further configured to determine whether the femtosecond laser pulses approach Fourier transform limit or not, and if not, the dispersion function is measured again.

Further, the first optical component includes passive optical devices. The known reference spectral phase function can be introduced by adjusting the relative distance and the relative angle between the passive optical devices to measure the dispersion function of the optical path of the system. According to the dispersion function, the relative distance and the relative angle between the passive optical devices are adjusted to perform dispersion compensation on the femtosecond laser pulses.

Further, the second optical component includes a first mirror, a scanning galvanometer module, a second mirror, a dichroic mirror, an optical microscope objective and a plurality of filters.

The first signal acquisition device includes a plurality of photodetectors corresponding to the plurality of filters, and the plurality of photodetectors are connected to the control device.

The compressed femtosecond laser pulses pass through the first mirror into the scanning galvanometer module, and are focused on the sample stage after passing through the second mirror, the dichroic mirror and the optical microscope objective in order.

The compressed femtosecond laser pulses interact with the tissue sample on the sample stage to generate the multimodality signals. The multimodality signals are reflected by the dichroic mirror to the plurality of filters for separation, collected by the plurality of photodetectors and sent to the control device.

Further, the multimodality signals include: a second harmonic signal with a spectral range from 570 nm to 630 nm, a third harmonic signal with a spectral range from 343 nm to 405 nm, a double-photon fluorescence spectrum signal with a spectral range from 510 nm to 565 nm, a three-photon fluorescence spectrum signal with a spectral range from 410 nm to 490 nm, and a nonlinear Raman signal with a spectral range from 640 nm to 723 nm.

The second harmonic signal may identify a cholesterol in the tissue sample. The third harmonic signal may identify a cytoplasm, a melanin and an intercellular vesicle in the tissue sample, wherein the intercellular vesicle is produced by a tumor. The double-photon fluorescence spectrum signal may identify an elastin, a flavin adenine dinucleotide and a basement membrane. The three-photon fluorescence spectrum signal may identify a distribution of reductive coenzyme in the tissue sample. The nonlinear Raman signal may to identify a lipoid compound and a blood cell.

The second harmonic signal, the third harmonic signal and the nonlinear Raman signal are superposed to identify a collagen fiber network and a myosin. The nonlinear Raman signal and the second harmonic signal are superposed to identify a DNA, a blood vessel and a lymphatic vessel.

The femtosecond laser multimodality molecular imaging system provided by the present invention at least includes the following advantages.

(1) The adopted near-infrared pulse generation device provides the near-infrared pulses with a central wavelength of 1010 nm to 1100 nm and a spectral width of less than 25 nm. The near-infrared pulses can excite an optical medium with strong nonlinearity to generate the femtosecond laser pulses with ultra-wide spectrum. The pulse measurement compression and control module measures and compensates the accumulated dispersion of the femtosecond laser pulses arriving at the tissue sample, so as to eliminate the pulse broadening effect in time domain" as much as possible. The obtained shortest pulses can interact with the tissue sample to generate spectral signals from different modalities, thus providing a variety of nonlinear molecular image modalities.

(2) The adopted birefringent photonic crystal fiber does not cause zero dispersion within the spectral range of the generated femtosecond laser pulses, has high light throughput efficiency, and can generate femtosecond laser pulses with average power greater than 500 milliwatts. Moreover, the birefringent photonic crystal fiber has good polarization property, and the spectrum of the generated femtosecond pulses can be adjusted by optimizing the polarization, power and incident angle of the incident light.

(3) The active adaptive optical devices can introduce the negative function of the dispersion function into the optical path of the system to counteract the system dispersion. When the compressed femtosecond laser pulses arrive at the sample position, the dispersion is equal to 0 or approaches 0, and the Fourier transform limited pulses are obtained to maximize the peak power of the pulses at the sample position, thereby improving the nonlinear signal generation efficiency of different molecules in the tissue sample, and improving the signal-to-noise ratio.

(4) Furthermore, the active adaptive optical devices can further optimize the spectral intensity and spectral phase of some nonlinear signals to achieve selective excitation and improve the specificity of multimodality signals.

(5) The present invention can generate the wide range of multimodality signals and such multimodality signals can identify a variety of components in the tissue samples, thereby improving the capability of the femtosecond laser imaging equipment to recognize a more diverse biological characteristics.

DETAILED DESCRIPTION OF THE EMBODIMENTS

In order to clearly illustrate the objective, technical solution and effect of the present invention, the present invention is further described in detail with reference to the drawings and embodiments hereinafter. It should be understood that the specific embodiments described herein are merely used to explain the present invention rather than limiting the present invention.

Figure 1:
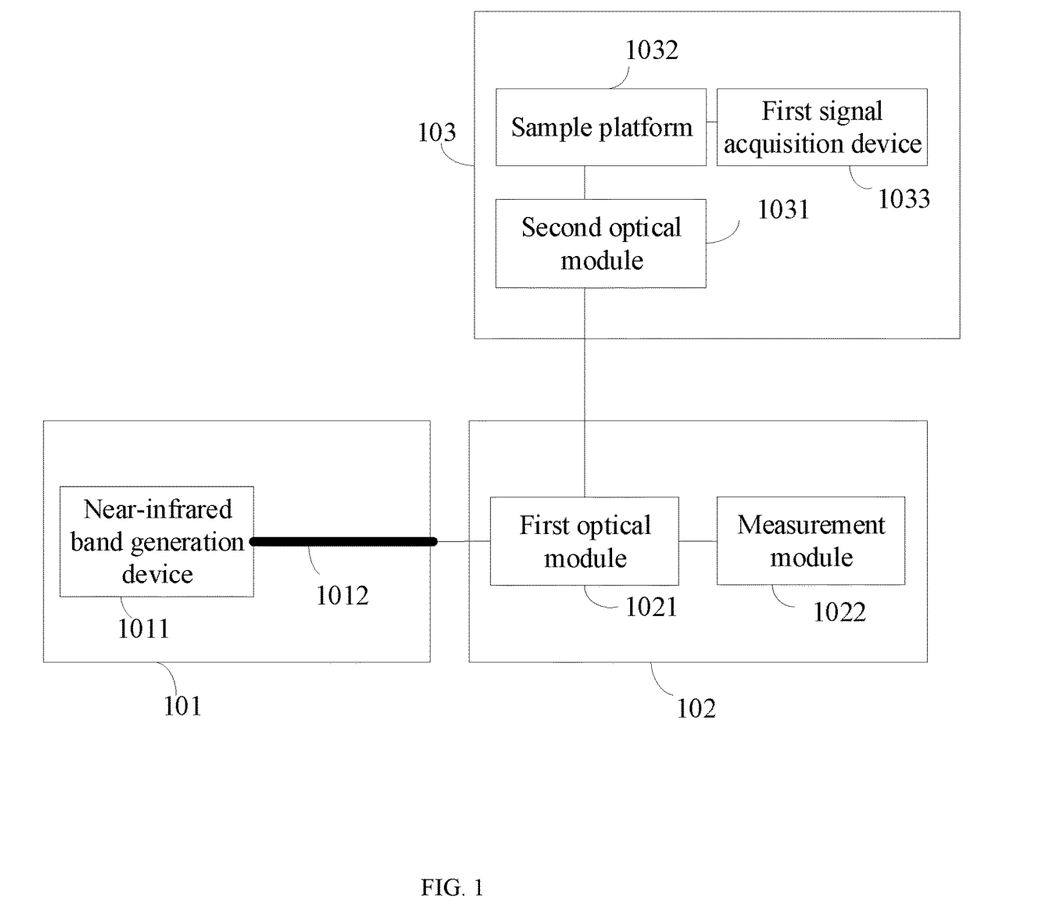
FIG. 1 is a structural schematic diagram showing a femtosecond laser multimodality molecular imaging system according to an embodiment of the present invention.

As shown in FIG. 1, the present embodiment provides a femtosecond laser multimodality molecular imaging system, including the supercontinuum generation module 101, the pulse measurement compression and control module 102 and the optical microscope module 103.

The supercontinuum generation module 101 includes the near-infrared pulse generation device 1011, and the optical medium 1012 with strong nonlinearity. The near-infrared pulse generation device 1011 is configured to provide the near-infrared pulses. The optical medium 1012 with strong nonlinearity is configured to be excited by the near-infrared pulses to generate the femtosecond laser pulses. The near-infrared pulses have a center wavelength of 1010 nm to 1100 nm, and a spectral width of less than 25 nm.

The pulse measurement compression and control module 102 includes the first optical component 1021 and the measurement module 1022. The first optical component 1021 is configured to receive the femtosecond laser pulses. The measurement module 1022 is configured to measure the dispersion in the optical path of the system, and, according to the measurement result, adjust the parameters of the first optical component 1021 to perform dispersion compensation on the femtosecond laser pulses to obtain the compressed femtosecond laser pulses.

The optical microscope module 103 includes the second optical component 1031, the sample stage 1032 and the first signal acquisition device 1033. The compressed femtosecond laser pulses arrive at the sample stage 1032 after passing through the second optical component 1031, and interact with the tissue sample on the sample stage 1032 to generate multimodality signals. The first signal acquisition device 1033 is configured to collect the multimodality signals.

In one embodiment of the femtosecond laser multimodality molecular imaging system of the invention, a near-infrared pulse generation device is configured to provide the near-infrared pulses with a central wavelength of 1010 nm to 1100 nm and a spectral width of less than 25 nm. The near-infrared pulses can excite the optical medium with strong nonlinearity to generate the femtosecond laser pulses with ultra-wide spectrum. The pulse measurement compression and control module measures and compensates the accumulated dispersion of the femtosecond laser pulses arriving at the tissue sample, so as to eliminate the "time domain broadening" effect as much as possible. The obtained shortest pulses can interact with the tissue sample to generate spectral signals from different modalities, thus providing a variety of nonlinear molecular image modalities.

As a preferred embodiment, the near-infrared pulse generation near-infrared pulse generation device is an Ytterbium-doped fiber laser, or other pulsed lasers configured to generate the desired wavelength, spectral width and pulse width, such as a commercial laser, or a pulsed laser having an all-normal-dispersion ytterbium-doped fiber laser structure. The all-normal-dispersion ytterbium-doped fiber laser structure is an all-fiber structure or a hybrid structure of fiber and free-spaced optical device.

The pulse width of the near-infrared pulse generation device is less than 1500 femtoseconds, and the spectral range of the femtosecond laser pulses generated from the optical medium with strong nonlinearity is from 750 nm to 1300 nm. As a preferred embodiment, the optical medium with strong nonlinearity is a birefringent photonic crystal fiber, and the birefringent photonic crystal fiber has a length of more than 45 mm, a birefringence of at least $5*10^{-6}$, a polarization extinction ratio greater than 15:1, and a normal dispersion in the transmitted band.

The birefringent photonic crystal fiber in the present embodiment does not cause zero dispersion within the spectral range of the generated femtosecond laser pulses, has high light throughput efficiency, and can generate femtosecond laser pulses greater than 500 milliwatts. Furthermore, the birefringent photonic crystal fiber has good polarization property, and can adjust the spectrum of the femtosecond laser pulses by optimizing the polarization, power and incident angle of the incident light.

Figure 2:
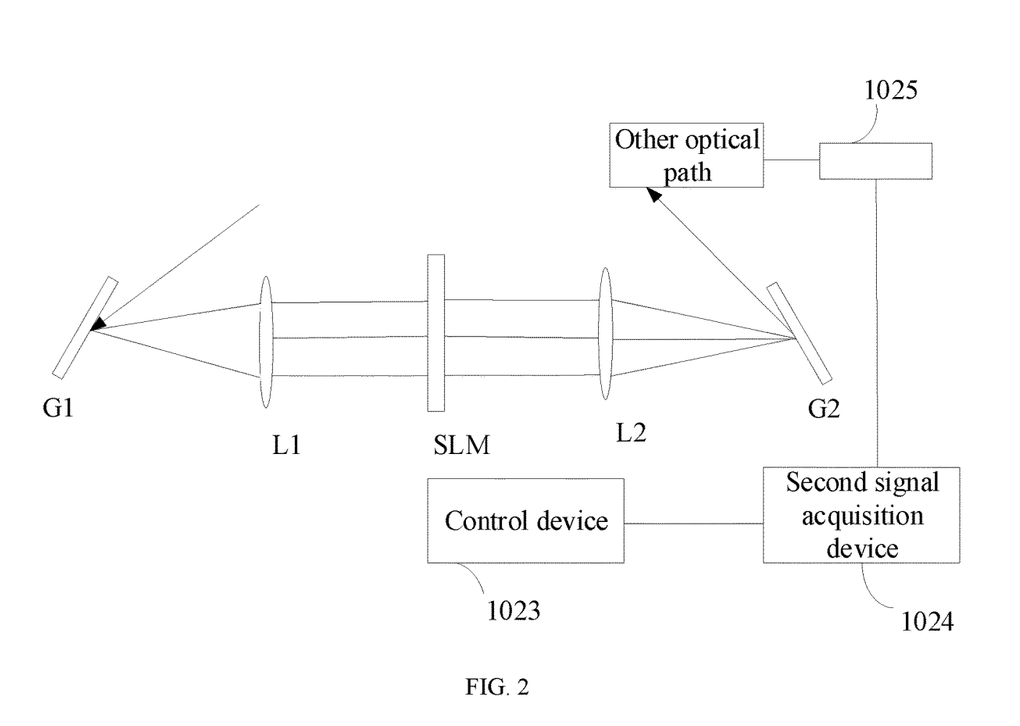
FIG. 2 is a structural schematic diagram showing a pulse measurement compression and control module in a femtosecond laser multimodality molecular imaging system according to an embodiment of the present invention.

Further, as shown in FIG. 2, as a preferred embodiment, the first optical component 1021 is a pulse shaper including an active adaptive optical device. The pulse shaper includes the first grating G1, the first convex lens L1, the liquid-crystal spatial light modulator SLM, the second convex lens L2 and the second grating G2, which are arranged successively. The first grating G1 is located in the focal point of the first convex lens L1. The distance between the first convex lens L1 and the liquid-crystal spatial light modulator (SLM) is one focal length, the distance between the liquid-crystal spatial light modulator SLM and the second convex lens L2 is one focal length, and the distance between the second convex lens L2 and the second grating G2 is one focal length.

Specifically, the femtosecond laser pulses generated by the supercontinuum generation module 101 contains a plurality of spectral wavelengths. After the femtosecond laser pulses pass through the first grating G1, the different wavelength within spectrum are scattered in space, and then focused by the first convex lens. After that, the plurality of spectral wavelengths are uniformly distributed at the one-focal-length position on the other side of the convex lens, so as to complete the Fourier transformation of the femtosecond laser pulses from the time domain to the frequency domain. The plane which the plurality of spectral wavelengths are uniformly distributed on is also referred to as the Fourier plane. The liquid-crystal spatial light modulator SLM is located on the Fourier plane. The optical path and the optical device behind the Fourier plane are the mirror images of the optical path in front of the Fourier plane. The plurality of spectral wavelengths are recombined through the second convex lens and the second grating to complete the pulse transformation from the frequency domain to the time domain. The liquid crystal of the liquid-crystal spatial light modulator SLM corresponds to the spectral wavelength one by one. The relative spectral phase between different wavelengths can be controlled by controlling the refractive index of different pixels corresponding to different spectral wavelengths by the liquid-crystal spatial light modulator SLM.

The active adaptive optical device includes, but is not limited to, a liquid-crystal spatial light modulator, an acousto-optic crystal, a deformable mirror and so on.

Further, the measurement module 1022 includes the control device 1023, the second signal acquisition device 1024, and the nonlinear crystal 1025 arranged on the sample stage.

The femtosecond laser pulses are focused on the nonlinear crystal 1025 to generate a nonlinear spectrum after passing through the pulse measurement compression and control module 102 and the optical microscope module 103. The second signal acquisition device 1024 is configured to collect the nonlinear spectrum signals and transmit the nonlinear spectrum signals to the control device 1023.

The control device 1023 is configured to control the parameters of the liquid-crystal spatial light modulator to introduce the known reference spectral phase function. By changing the known reference spectral phase function, a dispersion function of the optical path of the system is measured. According to the dispersion function, the parameters of the liquid-crystal spatial light modulator are adjusted to control the spectral phase of each wavelength of the femtosecond laser pulses to counteract the dispersion.

Specifically, the refractive index of each pixel of the liquid-crystal spatial light modulator can be adjusted to control the phase of each wavelength of the femtosecond laser pulses.

As a preferred embodiment, the nonlinear crystal is a BBO crystal or a KDP crystal. The thickness of the nonlinear crystal is from 10 μm to 300 μm. In this thickness range, the phase matching condition can be effectively satisfied within the whole laser spectrum range.

Specifically, when the dispersion of the system is measured, one or a series of known reference spectral phase functions (such as parabola function, sine function, etc.) are introduced into the system by changing the parameters of the liquid-crystal spatial light modulator. Each of the different known reference spectral phase functions will cause the change of the total spectral phase of the system, resulting in a change in the nonlinear expression of the femtosecond laser pulses. At this time, the nonlinear crystal is placed at any position behind the pulse measurement compression and control module to collect the nonlinear spectrum signal, and then the total dispersion accumulated at that position can be measured.

As a preferred embodiment, the known reference spectral phase function includes, but is not limited to, a parabolic function and a sinusoidal function. The nonlinear spectrum includes, but is not limited to, a second harmonic spectrum.

The control device is also configured to analyze the maximum value of the second harmonic spectrum each time the known reference spectral phase function is changed, so as to obtain a second derivative of the dispersion to be measured, and integrate the second derivative twice to obtain the dispersion function of the optical path of the system.

Figure 3:
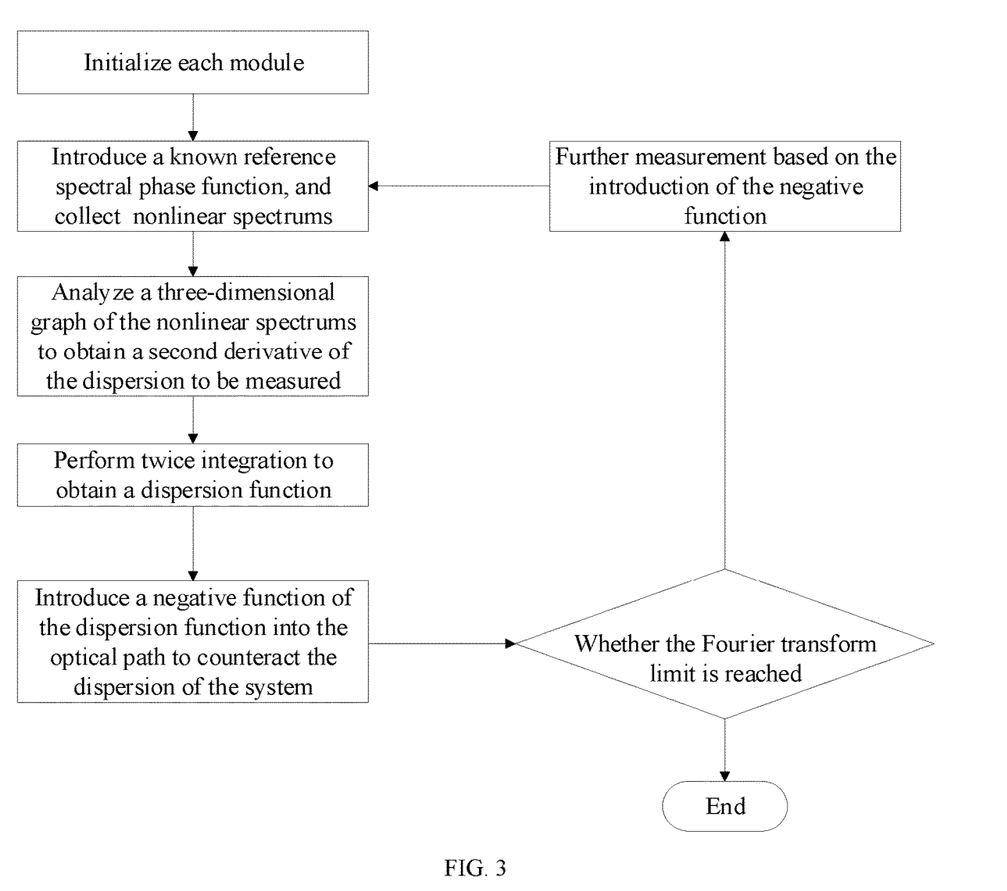
FIG. 3 is a flowchart of a dispersion measurement and compensation method in a femtosecond laser multimodality molecular imaging system according to an embodiment of the present invention.

Specifically, as shown in FIG. 3, when the femtosecond laser pulses arrive at the nonlinear crystal, the second harmonic signal is generated, and then the second harmonic signal is collected by the second signal acquisition device and sent to the control device. Each time the known reference spectral phase function is changed, one nonlinear spectrum of the second harmonic can be measured. After changing the known reference spectral phase function many times, the control device will obtain a three-dimensional graph with the wavelength or frequency as the X axis, the reference phase function as the Y axis, and the signal intensity as the Z axis. The second derivative of the dispersion to be measured of the system can be measured directly by analyzing the maximum value of the three-dimensional graph. After performing integration twice on the obtained second derivative, the accumulated total dispersion of the femtosecond laser pulses arriving at the sample position, that is, the dispersion function of the optical path of the system, can be calculated.

Further, after measuring the dispersion function, the control device is also used to change the parameters of the pulse shaper to introduce a negative function of the dispersion function, and control the spectral phase of each wavelength of the femtosecond laser pulses to counteract the dispersion.

Specifically, the control device introduces the negative function of the dispersion function with the spatial light modulator to adjust the refractive index of each pixel and control the phase of each wavelength of the femtosecond laser pulses.

The control device is also used to determine whether the femtosecond laser pulses approach the Fourier transform limit or not, and if not, the dispersion function is measured again.

After counteracting the dispersion of the femtosecond laser pulse, the total dispersion of the femtosecond laser pulse is 0 or approximately 0, that is, the compressed femtosecond laser pulse is obtained.

Specifically, the expression of the femtosecond laser pulses generated by the supercontinuum generation module 101 is as follows:

$$E(t) = \frac{1}{2\pi} \int_{-\infty}^{+\infty} E(\omega) e^{i\theta(\omega)} e^{-i\omega t} d\omega$$

where, $E(t)$ is the expression of the femtosecond pulses in the time domain, $E(\omega)$ is the spectral intensity term, $e^{-i\omega t}$ is the phase term, t is the time, $\omega$ is the frequency, and $\theta(\omega)$ is the initial dispersion of the femtosecond pulses.

The light transmittance function of controlling the spectral intensity, where the liquid-crystal spatial light modulator controlled by the control device is introduced into the system, is $T(\omega)$, and the function of controlling the spectral phase of the system is $\varepsilon(\omega)$, and the mathematical expression of the femtosecond laser pulses emitted after passing through the first optical component is as follows:

$$E_{out}(t) = \frac{1}{2\pi} \int_{-\infty}^{+\infty} M(\omega) E(\omega) e^{-i\omega t} d\omega$$

where, $M(\omega) = \sqrt{T(\omega)} \, e^{i[\varepsilon(\omega) + \theta(\omega)]}$.

After passing through the first optical component and the optical microscope module, the femtosecond laser pulses arrive at the nonlinear crystal at the sample position to generate the second harmonic signal, wherein the dispersion function to be measured is $\phi(\omega)$ (including the initial dispersion of the femtosecond laser pulse, the dispersion introduced by passing through the pulse measurement compression and control module and the optical microscope module, and the phase introduced by the control device), and the introduced known reference spectral phase function is $f(\omega)$, and the spectral phase $\varphi(\omega)$ of the femtosecond laser pulse at the nonlinear crystal is the sum of the two as follows:

$$\varphi(\omega) = \phi(\omega) + f(\omega)$$

The mathematical expression of the second harmonic is as follows:

$$I_{SHG}(2\omega) \propto |\int |E_0(\omega+\Omega)||E_0(\omega-\Omega)| \exp[i(\varphi(\omega+\Omega)+\varphi(\omega-\Omega))] d\Omega|^2;$$

where, $I_{SHG}(2\omega)$ is the signal intensity of the second harmonic signal at the $2\omega$ frequency, $\omega$ is the fundamental frequency, $\Omega$ is the frequency difference between the frequency of the photon pair producing the second harmonic signal and the central frequency $\omega$, $E_0(\omega+\Omega)$ is the intensity of the femtosecond laser pulse at the frequencies $\omega+\Omega$, and $E_0(\omega-\Omega)$ is the intensity of the femtosecond laser pulse at the frequencies $\omega-\Omega$; the exponential term $\varphi(\omega+\Omega)+\varphi(\omega-\Omega)$ is the sum of the phases of the photon pairs capable of producing the second harmonic signal at $2\omega$, and when this term approaches to 0, the exponential term is 1, and the integral reaches the maximum. Performing a Taylor polynomial expansion $((\Omega \ll \omega))$ on this term:

$$\varphi(\omega+\Omega)+\varphi(\omega-\Omega)\approx\varphi(\omega)+\varphi^{(2)}(\omega)\Omega^2+\tfrac{1}{12}\varphi^{(4)}(\omega)\Omega^4+\tfrac{1}{360}\varphi^{(6)}(\omega)\Omega^6+\ldots$$

By omitting the higher order term, it can be approximately obtained that when $\varphi^{(2)}(\omega)$ is equal to 0, that is, when $\varphi^{(2)}(\omega)=\phi^{(2)}(\omega)+f^{(2)}(\omega)$ approaches 0, the second harmonic signal at $2\omega$ is the maximum. For example, when the known reference spectral phase function is a parabolic function $f(\omega)=\tfrac{1}{2}\beta\cdot\omega^2$, the scanning parameter is parabolic intensity $\beta$, and the second derivative of the parabolic function $f(\omega)=\tfrac{1}{2}\beta\cdot\omega^2$ is equal to the scanning parameter $\beta$. For each of different scanning parameters $\beta$, a corresponding second harmonic spectrum is collected. Therefore, after different parameters $\beta$ are scanned, the control device will collect a three-dimensional graph with the wavelength and frequency as the X axis, the scanning parameter $\beta$ as the Y axis, and the second harmonic signal intensity as the Z axis. For any frequency $\omega_1$, the position with the greatest signal intensity can be directly obtained, that is, the position where $\varphi^{(2)}(\omega_1)=\phi^{(2)}(\omega_1)+f^{(2)}(\omega_1)$ approaches 0. The value of $f^{(2)}(\omega_1)$ is the scanning parameter $\beta 1$ corresponding to the position, that is, the second derivative $\varphi^{(2)}(\omega_1)=-f^{(2)}(\omega_1)=-\beta 1$ of the dispersion to be measured. By repeating the above steps for each spectral wavelength in the measurement range, a function of the relative wavelength or frequency of the dispersion to be measured can be obtained. After performing integration twice on the obtained function, the accumulated total dispersion of the pulses arriving at the sample position can be calculated.

After measuring the dispersion function, the adopted active adaptive optical device can introduce the negative function of the dispersion function into the optical path of the system to counteract the system dispersion. Therefore, when the compressed femtosecond laser pulses arrive at the sample position, the dispersion is equal to 0 or approaches 0, and the Fourier transform limited pulses are obtained, thereby maximizing the pulse peak power at the sample position, maximizing the nonlinear signal generation efficiency of different molecules in the tissue sample and improving the signal-to-noise ratio.

In addition, on the basis of obtaining the Fourier transform limited pulses, the adopted active adaptive optical devices can further optimize the spectral intensity and spectral phase of some nonlinear signals to achieve selective excitation and improve the specificity of multimodality signals.

In another optional embodiment, the first optical component is passive optical devices, including but not limited to a series of passive optical devices with second-order dispersion spectral phase function such as a grating pair, a prism pair, and a prism grating. The known reference spectral phase function is introduced by adjusting a relative distance and a relative angle between the passive optical devices to measure the dispersion function of the optical path of the system and complete the measurement of the total dispersion of the pulse at the sample position. Then, the relative distance and the relative angle between the passive optical devices are adjusted to perform dispersion compensation on the femtosecond laser pulses.

The adopted passive optical devices can extract the second-order dispersion data and third-order dispersion data from the measured system dispersion function by linear fitting, and then the distance and relative angle between the devices can be adjusted manually or automatically to counteract the second-order dispersion and third-order dispersion as much as possible, making the pulse at the sample position as close to the Fourier transform limit as possible to optimize the signal-to-noise ratio.

Figure 4:
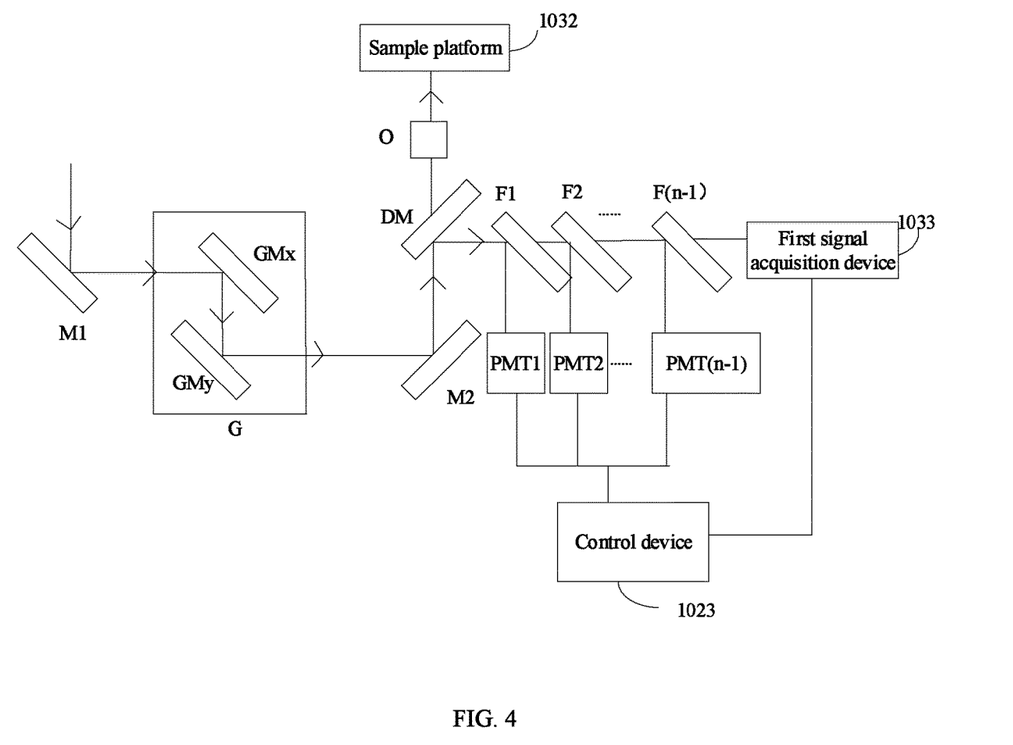
FIG. 4 is a structural schematic diagram showing an optical microscope module in a femtosecond laser multimodality molecular imaging system according to an embodiment of the present invention.

As shown in FIG. 4, the second optical component includes the first mirror M1, the scanning galvanometer module G, the second mirror M2, the dichroic mirror DM, the optical microscope objective O and a plurality of filters F1-F(n−1).

The first signal acquisition device includes a plurality of photodetectors PMT1-PMT(n−1) corresponding to the plurality of filters, and the plurality of photodetectors are connected to the control device.

The compressed femtosecond laser pulse passes through the first mirror M1 into the scanning galvanometer module G, then passes through the second mirror M2, the dichroic mirror DM and the optical microscope objective O in order, and is focused on the sample stage 1032.

Specifically, the scanning galvanometer module G includes X-axis galvanometer GMx and Y-axis galvanometer GMy. The scanning galvanometer module is controlled to scan the X-axis and Y-axis, and the optical stage piezoelectric scanner or optical microscope is controlled to scan Z-axis. The tissue sample is directly placed on the sample stage without preparation.

The compressed femtosecond laser pulses interact with the tissue sample on the sample stage to generate multimodality signals. The multimodality signals are reflected by the dichroic mirror to the plurality of filters for separation, collected by the plurality of photodetectors and sent to the control device.

The control device analyzes the multimodality signal.

Further, the multimodality signals include: a second harmonic signal with a spectral range from 570 nm to 630 nm, a third harmonic signal with a spectral range from 343 nm to 405 nm, a double-photon fluorescence spectrum signal with a spectral range from 510 nm to 565 nm, a three-photon fluorescence spectrum signal with a spectral range from 410 nm to 490 nm, and a nonlinear Raman signal with a spectral range from 640 nm to 723 nm.

The second harmonic signal is configured to identify the cholesterol in the tissue sample; the third harmonic signal is configured to identify the cytoplasm, the melanin and the intercellular vesicle in the tissue sample, wherein the intercellular vesicle is produced by the tumor; the double-photon fluorescence spectrum signal is configured to identify the elastin, the flavin adenine dinucleotide and the basement membrane; the three-photon fluorescence spectrum signal is configured to identify the distribution of reductive coenzyme in the tissue sample; the nonlinear Raman signal is configured to identify the lipoid compound and the blood cell.

The second harmonic signal, the third harmonic signal and the nonlinear Raman signal are superposed to identify the collagen fiber network and the myosin; the nonlinear Raman signal and the second harmonic signal are superposed to identify the DNA, the blood vessel and the lymphatic vessel.

The femtosecond laser multimodality molecular imaging system in the present embodiment can generate a wide range of multimodality signals, and the multimodality signals can identify a variety of components in a tissue sample, thereby improving the diversity of recognition of the femtosecond laser imaging equipment.

In summary, the femtosecond laser multimodality molecular imaging system provided by the present embodiment includes at least the following advantages.

(1) The adopted near-infrared pulse generation device provides the near-infrared pulses with a central wavelength of 1010 nm to 1100 nm and a spectral width of less than 25 nm. The near-infrared pulses can excite an optical medium with strong nonlinearity to generate the femtosecond laser pulses with ultra-wide spectrum. The pulse measurement compression and control module measures and compensates the accumulated dispersion of the femtosecond laser pulses arriving at the tissue sample, so as to eliminate the "time domain broadening" effect as much as possible. The obtained shortest pulses can interact with the tissue sample to generate spectral signals from different modalities, thus providing a variety of nonlinear molecular image modalities.

(2) The adopted birefringent photonic crystal fiber does not cause zero dispersion within the spectral range of the generated femtosecond laser pulses, has high light throughput efficiency, and can generate femtosecond laser pulses greater than 500 milliwatts. Moreover, the birefringent photonic crystal fiber has good polarization, and can adjust the spectrum of the femtosecond laser pulses by optimizing the polarization, power and incident angle of the incident light.

(3) The adopted active adaptive optical devices can introduce the negative function of the dispersion function into the optical path of the system after measuring the dispersion function, thereby counteracting the system dispersion. When the compressed femtosecond laser pulses arrive at the sample position, the dispersion is equal to 0 or approaches 0, and the Fourier transform limited pulses are obtained, thereby maximizing the pulse peak power at the sample position, maximizing the nonlinear signal generation efficiency of different molecules in the tissue sample, and improving the signal-to-noise ratio.

(4) On the basis of obtaining the Fourier transform limited pulses, the adopted active adaptive optical devices can further optimize the spectral intensity and spectral phase of some nonlinear signals to achieve selective excitation and improve the specificity of multimodality signals.

(5) A wide range of multimodality signals are obtained, and the multimodality signals can identify a variety of components in tissue sample, thereby improving the diversity of recognition by the femtosecond laser imaging equipment.

It should be understood that those skilled in the art can make improvements or modifications in accordance with the above instructions, and all such improvements and modifications shall fall within the scope of protection of the claims as claimed in the present invention.

What is claimed is:

1. A femtosecond laser multimodality molecular imaging system, comprising a supercontinuum generation module, a pulse measurement compression and control module and an optical microscope module; wherein, the supercontinuum generation module comprises a near-infrared pulse generation device, and an optical medium with strong nonlinearity; the near-infrared pulse generation device is configured to generate near-infrared pulses having a center wavelength of 1010 nm to 1100 nm, and a spectral width of less than 25 nm; the optical medium with strong nonlinearity is configured to be excited by the near-infrared pulses to generate femtosecond laser pulses;

the pulse measurement compression and control module comprises a first optical component and a measurement module; the first optical component is configured to receive the femtosecond laser pulses; the measurement module is configured to measure a dispersion in an optical path of a system, adjust parameters of the first optical component to perform dispersion compensation on the femtosecond laser pulses according to a measurement result, and obtain compressed femtosecond laser pulses; and the optical microscope module comprises a second optical component, a sample stage and a first signal acquisition device; wherein the second optical component comprises a first mirror, a scanning galvanometer module, a second mirror, a dichroic mirror, an optical microscope objective and a plurality of filters; and the first signal acquisition device comprises a plurality of photodetectors corresponding to the plurality of filters, and the plurality of photodetectors are connected to a first control device; the compressed femtosecond laser pulses arrive at the sample stage after passing through the second optical component, and interact with a tissue sample on the sample stage to generate multimodality signals; and the first signal acquisition device is configured to collect the multimodality signals; wherein the compressed femtosecond laser pulses are focused after passing through the first mirror into the scanning galvanometer module; and the multimodality signals are reflected by the dichroic mirror to the plurality of filters for separation, collected by the plurality of photodetectors and sent to the first control device.

2. The femtosecond laser multimodality molecular imaging system according to claim 1, wherein, the near-infrared pulse generation device is an Ytterbium-doped fiber laser or a pulsed laser, and a pulse width of the near-infrared pulse generation device is less than 1500 femtoseconds;

a spectral range of the femtosecond laser pulses generated from the optical medium with strong nonlinearity is from 750 nm to 1300 nm; and the optical medium with strong nonlinearity is a birefringent photonic crystal fiber, and the birefringent photonic crystal fiber has a length of more than 45 mm, a birefringence of at least $5*10^{-6}$, and a normal dispersion in a transmitted band.

3. The femtosecond laser multimodality molecular imaging system according to claim 1, wherein, the first optical component is a pulse shaper having an active adaptive optical device; the pulse shaper comprises a first grating, a first convex lens, a liquid-crystal spatial light modulator, a second convex lens and a second grating, wherein the first grating, the first convex lens, the liquid-crystal spatial light modulator, the second convex lens and the second grating are arranged successively; the first grating is located in a focal point of the first convex lens; a distance between the first convex lens and the liquid-crystal spatial light modulator is one focal length, a distance between the liquid-crystal spatial light modulator and the second convex lens is one focal length, and a distance between the second convex lens and the second grating is one focal length.

4. The femtosecond laser multimodality molecular imaging system according to claim 2, wherein, the first optical component is a pulse shaper having an active adaptive optical device; the pulse shaper comprises a first grating, a first convex lens, a liquid-crystal spatial light modulator, a second convex lens and a second grating, wherein the first grating, the first convex lens, the liquid-crystal spatial light modulator, the second convex lens and the second grating are arranged successively; the first grating is located in a focal point of the first convex lens; a distance between the first convex lens and the liquid-crystal spatial light modulator is one focal length, a distance between the liquid-crystal spatial light modulator and the second convex lens is one focal length, and a distance between the second convex lens and the second grating is one focal length.

5. The femtosecond laser multimodality molecular imaging system according to claim 3, wherein, the measurement module comprises a second control device, a second signal acquisition device, and a nonlinear crystal placed on the sample stage;
the femtosecond laser pulses are focused on the nonlinear crystal to generate nonlinear spectral signals after passing through the pulse measurement compression and control module and the optical microscope module; the second signal acquisition device is configured to collect the nonlinear spectral signals and transmit the nonlinear spectral signals to the second control device; and
the second control device is configured to control parameters of the liquid-crystal spatial light modulator to introduce a known reference spectral phase function; a dispersion function of the optical path of the system is measured by changing the known reference spectral phase function; according to the dispersion function, the parameters of the liquid-crystal spatial light modulator are adjusted to control the spectral phase of each wavelength of the femtosecond laser pulses, so as to counteract the dispersion.

6. The femtosecond laser multimodality molecular imaging system according to claim 4, wherein, the measurement module comprises a second control device, a second signal acquisition device, and a nonlinear crystal placed on the sample stage;
the femtosecond laser pulses are focused on the nonlinear crystal to generate nonlinear spectral signals after passing through the pulse measurement compression and control module and the optical microscope module; the second signal acquisition device is configured to collect the nonlinear spectral signals and transmit the nonlinear spectral signals to the second control device; and
the second control device is configured to control parameters of the liquid-crystal spatial light modulator to introduce a known reference spectral phase function; a dispersion function of the optical path of the system is measured by changing the known reference spectral phase function; according to the dispersion function, the parameters of the liquid-crystal spatial light modulator are adjusted to control the spectral phase of each wavelength of the femtosecond laser pulses, so as to counteract the dispersion.

7. The femtosecond laser multimodality molecular imaging system according to claim 5, wherein, the nonlinear crystal is a BBO crystal or a KDP crystal, and a thickness of the nonlinear crystal is from 10 μm to 300 μm.

8. The femtosecond laser multimodality molecular imaging system according to claim 6, wherein, the nonlinear crystal is a BBO crystal or a KDP crystal, and a thickness of the nonlinear crystal is from 10 μm to 300 μm.

9. The femtosecond laser multimodality molecular imaging system according to claim 5, wherein, the known reference spectral phase function comprises a parabolic function and a sinusoidal function; the nonlinear spectral signals are second harmonic spectrums; and the second control device is further configured to analyze a maximum value of the second harmonic spectrum each time the known reference spectral phase function is changed so as to obtain a second derivative of the dispersion to be measured, and integrate the second derivative twice to obtain the dispersion function of the optical path of the system.

10. The femtosecond laser multimodality molecular imaging system according to claim 6, wherein, the known reference spectral phase function comprises a parabolic function and a sinusoidal function; the nonlinear spectral signals are second harmonic spectrums; and
the second control device is further configured to analyze a maximum value of the second harmonic spectrum each time the known reference spectral phase function is changed so as to obtain a second derivative of the dispersion to be measured, and integrate the second derivative twice to obtain the dispersion function of the optical path of the system.

11. The femtosecond laser multimodality molecular imaging system according to claim 9, wherein, the second control device is further configured to change parameters of the pulse shaper to introduce a negative function of the dispersion function, and control the spectral phase of each wavelength of the femtosecond laser pulses to counteract the dispersion; and
the second control device is further configured to determine whether the femtosecond laser pulses approach Fourier transform limit or not, and when the femtosecond laser pulses have not approached to the Fourier transform limit, the dispersion function is measured again.

12. The femtosecond laser multimodality molecular imaging system according to claim 10, wherein, the second control device is further configured to change parameters of the pulse shaper to introduce a negative function of the dispersion function, and control the spectral phase of each wavelength of the femtosecond laser pulses to counteract the dispersion; and
the second control device is further configured to determine whether the femtosecond laser pulses approach Fourier transform limit or not, and when the femtosecond laser pulses have not approached to the Fourier transform limit, the dispersion function is measured again.

13. The femtosecond laser multimodality molecular imaging system according to claim 1, wherein, the first optical component comprises passive optical devices; a known reference spectral phase function is introduced by adjusting a relative distance and a relative angle between the passive optical devices to measure a dispersion function of the optical path of the system; and according the dispersion function, the relative distance and the relative angle between the passive optical devices are adjusted to perform the dispersion compensation on the femtosecond laser pulses.

14. The femtosecond laser multimodality molecular imaging system according to claim 1, wherein, the multimodality signals comprise: a second harmonic signal with a spectral range from 570 nm to 630 nm, a third harmonic signal with a spectral range from 343 nm to 405 nm, a double-photon fluorescence spectrum signal with a spectral range from 510 nm to 565 nm, a three-photon fluorescence spectrum signal with a spectral range from 410 nm to 490 nm, and a nonlinear Raman signal with a spectral range from 640 nm to 723 nm;
the second harmonic signal is used to identify a cholesterol in the tissue sample; the third harmonic signal is used to identify a cytoplasm, a melanin and an intercellular vesicle in the tissue sample, wherein the intercellular vesicle is produced by a tumor; the double-photon fluorescence spectrum signal is used to identify an elastin, a flavin adenine dinucleotide and a basement membrane; the three-photon fluorescence spectrum signal is used to identify a distribution of reductive coenzyme in the tissue sample; the nonlinear Raman signal is used to identify a lipoid compound and a blood cell;

the second harmonic signal, the third harmonic signal and the nonlinear Raman signal are superposed to identify a collagen fiber network and a myosin; the nonlinear Raman signal and the second harmonic signal are superposed to identify a DNA, a blood vessel and a lymphatic vessel.

\* \* \* \* \*